April 21, 1931. D. P. MOLONY Re. 18,052

AUTOMATIC CHARGE HEATING CONTROL FOR INTERNAL COMBUSTION ENGINES

Original Filed Oct. 23, 1919

Inventor
Donald Plummer Molony
By Charles D. Wills
Atty

Reissued Apr. 21, 1931

Re. 18,052

UNITED STATES PATENT OFFICE

DONALD PLUMMER MOLONY, OF FLINT, MICHIGAN, ASSIGNOR TO MARVEL CARBURETER COMPANY, OF FLINT, MICHIGAN, A CORPORATION OF INDIANA

AUTOMATIC CHARGE-HEATING CONTROL FOR INTERNAL-COMBUSTION ENGINES

Original No. 1,625,135, dated April 19, 1927, Serial No. 332,703, filed October 23, 1919. Application for reissue filed March 21, 1929. Serial No. 348,923.

This invention relates to certain new and useful improvements in automatic charge heating control for combustion engines, and is a companion application of one executed of even date herewith; the object being to automatically control the application of heat on the charge delivered to the engine by the amount of vacuum at the throat of the carbureter.

Another object of the invention is to provide a heat control in which a vacuum chamber is employed having a pipe extending to the throat of the carbureter and provided with a plunger for operating means for controlling the admission of heating fluid to the heating chamber.

Another and further object of the invention is to provide manually operated means for resisting the automatic means in order to allow the heating fluid to pass into the heating chamber for warming up purposes.

With these objects in view, the invention consists of the novel features of construction, combination and arrangement of parts, hereinafter fully set forth and pointed out in the claims.

Figure 1:
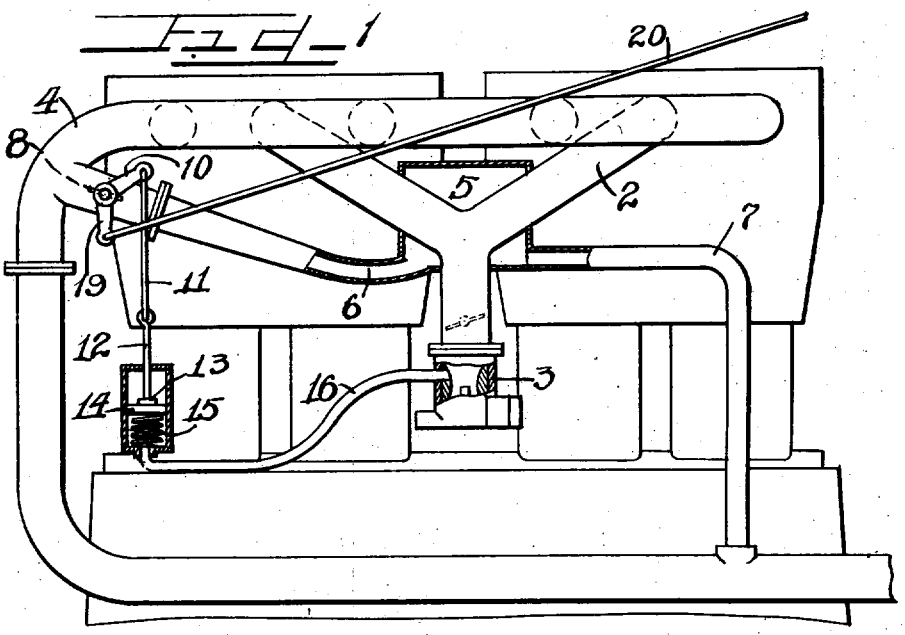
Figure 1 is a side elevation of an internal combustion engine partly in section, showing the application of my improved construction of automatic heat control.

In the drawing, 1 indicates an internal combustion engine having an intake manifold 2, to which is connected the carbureter, 3. The engine is provided with an exhaust pipe 4, of the ordinary construction, the above description being given so that the operation of my improved construction of my automatic control can be readily understood.

The intake manifold 2, is surrounded by a heating chamber 5 having an inlet pipe 6 connected to the exhaust pipe 4, and an outlet pipe 7, connected to the exhaust pipe 4, in order to obtain a circulation of the heating medium. The inlet pipe 6 is provided with a valve 8 for controlling the admission of the exhaust gases, said valve being carried by the stem 9 having a crank arm 10 to which is connected a link 11. The link 11 is connected to a plunger rod 12 carried by a plunger 13 mounted in the vacuum chamber 14, the movement of which is resisted by a spring 15, as clearly shown in Figure 1 in which figure the piston 13 is in its uppermost position. The vacuum chamber 14 is connected to the throat of the carbureter 3 by a pipe 16, so that the amount of vacuum existing in the throat of the carbureter will control the position of the plunger in the vacuum chamber which in turn will control the position of the valve so that the admission of the heating medium to the heating chamber will be automatically regulated. As the suction in the throat of the carburetor increases the valve is closed so as to cut off the supply of exhaust gases to the heater. It will be seen by this construction that the admission of the heating fluid is automatically controlled by the changing vacuum existing in the carbureter or gas delivering duct, as the case may be, as I do not wish to limit myself to any particular point of connection of the vacuum chamber to the carbureter or induction pipe; but I have found in practice that good results can be obtained by connecting the vacuum chamber to the throat of the carbureter.

An internal combustion engine provided with the control thus far described will in starting, especially if the engine is raced, some time cut off the admission of heating fluid before the engine has warmed up, and in order to provide means for resisting the operation of the automatic means I provide the valve stem 9 with a pin 17, which is engaged by a shoulder formed on a collar 18 loosely mounted on the stem and provided with an arm 19 having dash-controlled means 20 connected thereto, whereby the driver can adjust the same so as to hold the valve in open position, in order to allow the full volume of exhaust gases to circulate through the heating chamber, so that the charge in its passage to the engine will be heated quickly.

Figure 2:
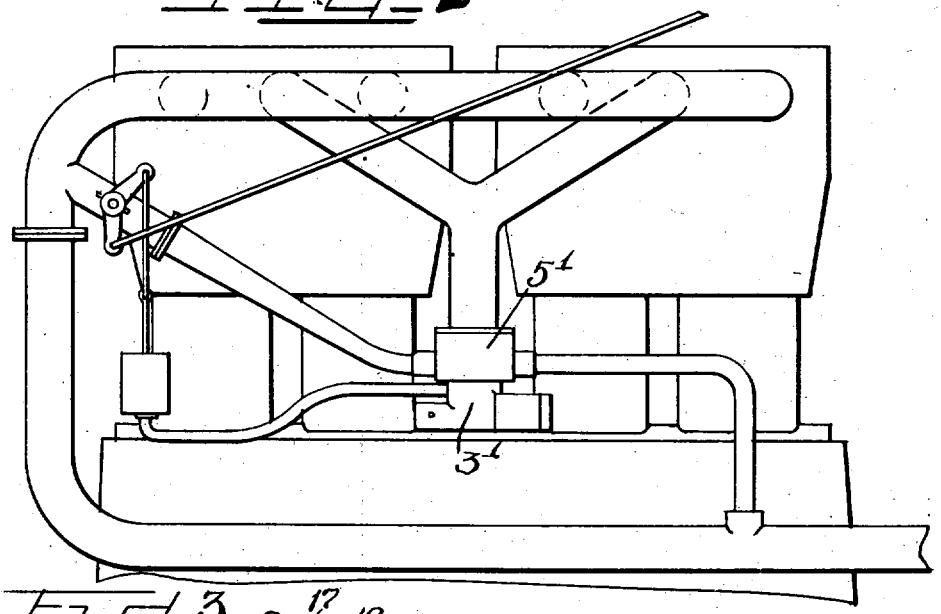
Figure 2 is a similar view showing the heating chamber disposed around the throttle or mixing chamber of the carbureter.
Figure 3:
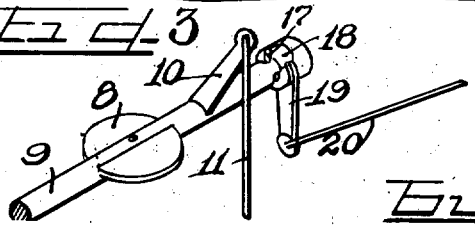
Figure 3 is a perspective view of the valve for controlling the admission of the heating fluid to the heating chamber.

In Figure 2, I have shown a similar construction with the exception that the carbureter 3′ is provided with a heating chamber 5′ surrounding the mixing and throttle chamber thereof, and the operation of the manually and automatically heat control is identical as previously described.

From the foregoing description, it will be seen that I have provided an automatic charge heating control for internal combustion engines, so constructed that the amount of vacuum existing in the induction pipe or carbureter automatically controls the admission of the heating medium to the heating chamber, whereby the explosive charge will be heated to the proper temperature, in order to obtain the best results.

It will thus be seen that I have provided an improved heat control for the mixture supply that gives a maximum heating effect under idling conditions and may be adjusted to cut down or eliminate the amount of heat supplied to the mixture during operation under full power. While I have chosen to illustrate two embodiments of this invention incorporating exhaust gas bypass passages for supplying heat to the manifold jackets, it is to be understood that the heat supply may be obtained from other sources without affecting the principles of heat regulation disclosed herein.

I am aware that numerous details of the invention may be varied through a wide range without departing from the spirit of this invention, and I do not desire limiting the patent granted other than as necessitated by the prior art.

What I claim is:—

1. An internal combustion engine having an exhaust pipe, intake manifold and carbureter connected thereto, a heater arranged to heat the charge in its passage from the carbureter to the engine and means actuated by the changing vacuum existing in the carbureting passage of the carbureter for cutting off the supply of exhaust gases to said heater as the suction in the carbureting passage increases.

2. An internal combustion engine having an exhaust pipe, intake manifold and carbureter connected thereto, a heater arranged to heat the charge delivered to the engine, a vacuum chamber, a connection between said vacuum chamber and the induction pipe leading to the engine below the throttle valve and a plunger working in said vacuum chamber having a connection with means for cutting off admission of heating fluid to said heater as the suction in the induction pipe at the point of connection with the vacuum chamber increases.

3. An internal combustion engine having an exhaust pipe, intake manifold and carbureter connected thereto, a heater arranged to heat the charge in its passage from the carbureter to the engine having a valve controlled inlet and means actuated by the vacuum existing in the carbureting passage of the carbureter for closing said valve for cutting off the admission of heating fluid to said heater as the suction in the carbureting passage increases.

4. An internal combustion engine having an intake manifold and a charge forming device, a heater arranged to heat the charge in its passage to the engine, a throttle valve controlling the vacuum in the charge forming device, and means for varying the heating effect of said heater, and a vacuum responsive device connected to said charge forming device and adapted to control the means for varying the heating effect in inverse proportion to the vacuum in said charge forming device.

5. An internal combustion engine having an intake manifold and carbureter connected thereto, a heater arranged to heat and charge in its passage from the carbureter to the engine, and means actuated by the changing vacuum existing in the carbureting passage of the carbureter for reducing the effectiveness of the heater as the suction in the carbureting passage increases.

6. An internal combustion engine having an intake manifold and carbureter connected thereto, a heater arranged to heat the charge in its passage from the carbureter to the engine, and means actuated by the changing vacuum existing in the carbureting passage of the carbureter for reducing the heat supplied to said charge as the suction in the carbureting passage increases.

In testimony whereof, I have hereunto subscribed my name at Flint, Genesee County, Michigan.

DONALD P. MOLONY.